Nov. 21, 1950 — W. L. ROTH — 2,530,541
WAVE METER
Filed July 27, 1944 — 4 Sheets-Sheet 1

INVENTOR
W. L. ROTH
BY E. V. Griggs
ATTORNEY

Nov. 21, 1950 W. L. ROTH 2,530,541
WAVE METER
Filed July 27, 1944 4 Sheets-Sheet 2

INVENTOR
W. L. ROTH
BY
*W. Griggs*
ATTORNEY

Nov. 21, 1950 W. L. ROTH 2,530,541
WAVE METER
Filed July 27, 1944 4 Sheets-Sheet 3

INVENTOR
W. L. ROTH
BY
E. V. Griggs
ATTORNEY

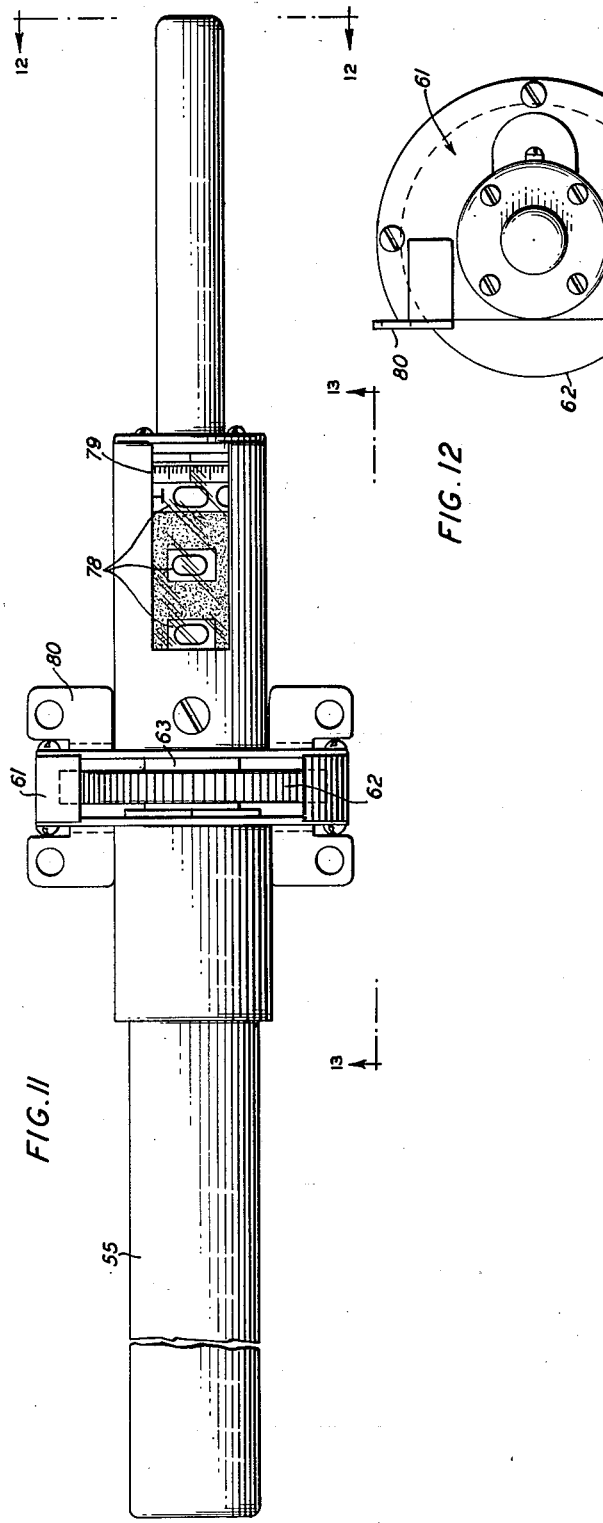
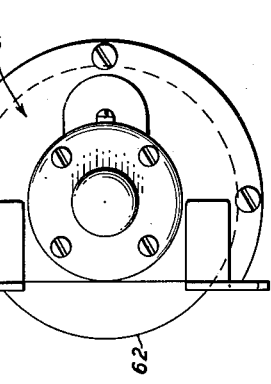
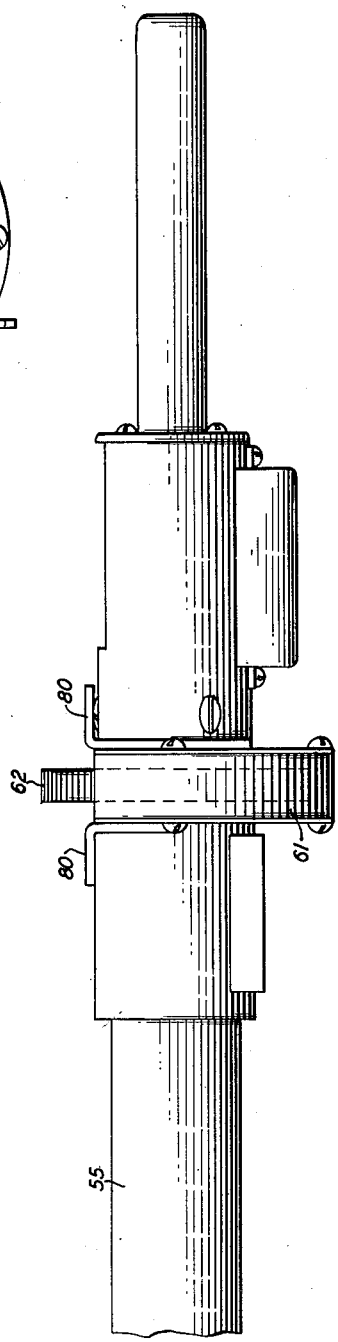

Patented Nov. 21, 1950

2,530,541

UNITED STATES PATENT OFFICE 2,530,541

WAVE METER

Walter L. Roth, Montclair, N. J., assignor to Bell Telephone Laboratories, Incorporated, New York, N. Y., a corporation of New York Application July 27, 1944, Serial No. 546,824

4 Claims. (Cl. 178—44)

This invention relates to wave meters.

An object of the invention is to provide a wave meter the indications of which may be conveniently read even by unskilled personnel.

Another object of the invention is to provide a wave meter of the resonance chamber type which may be rugged and compact.

An additional object of the invention is to provide a wave meter the indicia of which, while readily visible, may be effectively protected from corrosion and wear.

In accordance with the invention the wave meter comprises a resonant cylindrical chamber having a coaxial tuning rod, the longitudinal position of which within the chamber determines the resonance frequency. The coaxial tuning rod may be varied in position by an actuator comprising a screw mechanism, the actuator handle being physically connected to the tuning rod. The position of the rod and hence the resonance frequency of the indicator is indicated by a revolution counter of the Veeder root type mechanically connected with the tuning rod by a device which is independent of the position of the actuator handle and which reduces to a negligible degree any backlash in the connection between the tuning rod and the revolution counter indicator.

The invention may be most readily understood by reference to the following specification taken in connection with the accompanying drawing in which.

Figure 1:
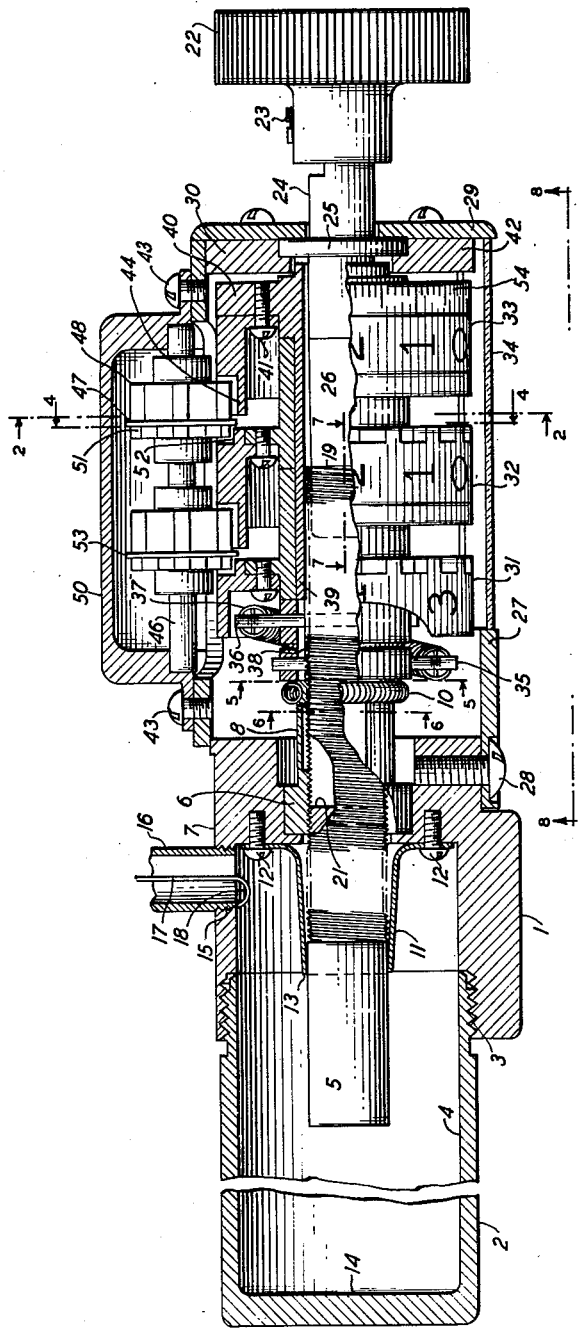
Fig. 1 is a longitudinal section on an enlarged scale of a wave meter involving one embodiment of the invention.
Figure 9:
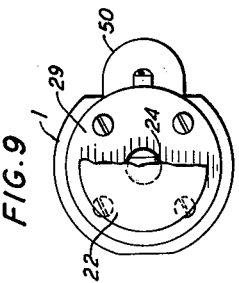
Figure 8:
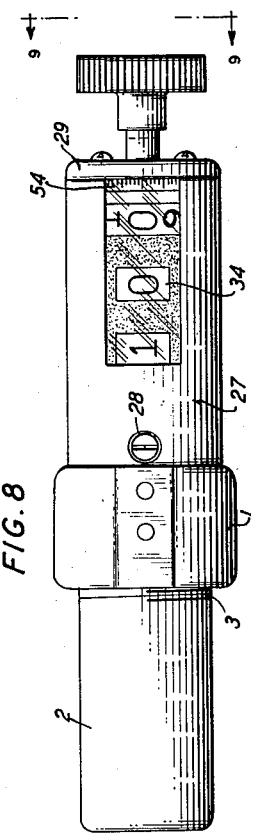
Figure 10:
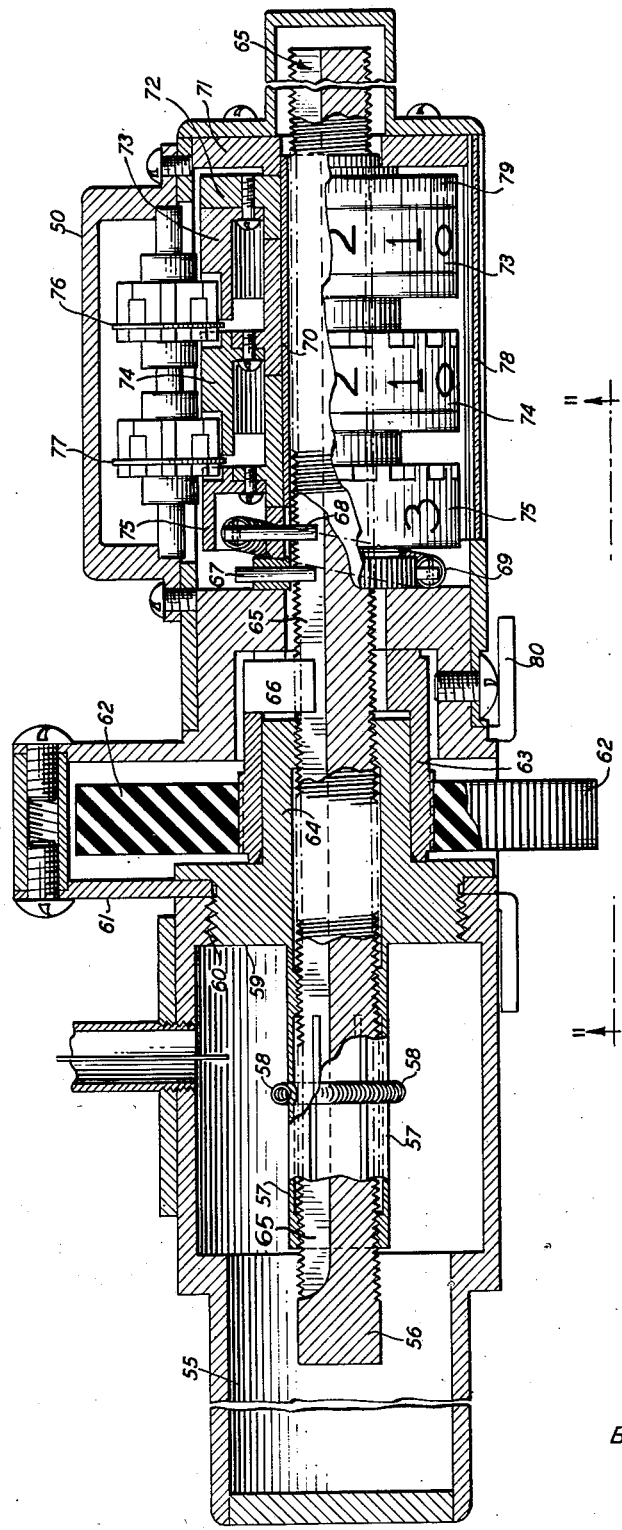

Figs. 4 to 7 inclusive, are cross-sections of the structure of Fig. 1 along the planes 4—4 to 7—7 respectively, viewed in the direction of the arrows indicating the respective planes;

Fig. 8 shows a complete assembly of the apparatus of Fig. 1 as viewed from the plane 8—8 of Fig. 1 in the direction of the arrows;

Fig. 9 is an end view of the apparatus of Fig. 8 viewed from the plane 9—9 of Fig. 8;

Fig. 10 is a longitudinal section on an enlarged scale of a modification of the wave meter of Fig. 1 involving a somewhat different embodiment of the invention;

Fig. 11 is an assembly of the apparatus of Fig. 10 viewed from the plane 11—11 of Fig. 10 in the direction of the arrows; and Figs. 12 and 13 are end and side views of the apparatus of Fig. 11 viewed from the planes 12—12 and 13—13, respectively, of Fig. 11 in the directions indicated by the arrows.

Figure 6:
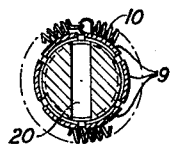

Referring to Fig. 1, the wave meter is shown to consist of three principal parts, namely, a variable frequency resonance chamber, an actuator for moving the tuning element to change the resonance frequency and a visible indicator coupled to the tuning element to indicate the position of that element and hence the frequency of the resonance chamber. The resonance chamber comprises the hollow space within a tubular main casing member 1 and a long cup-shaped member 2 connected thereto by screw-threads 3 to present a smooth interior cylindrical wall 4 which may be gold-plated or otherwise coated with material of high electrical conductivity. Tuning of the resonance chamber is effected by a coaxial tuning rod 5 which projects into the chamber and which is integral with an interiorly threaded shaft extending through a central screw-threaded bearing in a sleeve 6 which fits tightly in a central recess in the end 7 of main casing member 1. The sleeve 6 is provided with an integral annular extension 8 spaced from the threaded shaft of tuning member 5 except at its free end where it is provided with interior screw threads which engage the exterior threads on the tuning rod 5 at a point of contact somewhat removed from the engagement previously described. Extension 8 is slitted longitudinally as indicated in Fig. 6 to provide a plurality of fingers 9. Around the exterior of the threaded portion of these fingers is a helical spring 10 arranged in a closed loop to urge the free ends of the fingers inwardly so as to constrain the screw threadings thereon into the closest possible engagement with both faces of the exterior threads on the shaft of tuning rod 5 thus tending to preclude backlash which might otherwise permit an error in the longitudinal positioning of rod 5. Within the resonance chamber and surrounding the tuning rod 5 is a ferrule 11 attached to the end 7 of the main casing member by screws 12. The ferrule is longitudinally slotted at its free end in a manner similar to the extension 8 to provide a number of resilient fingers 13 which serve to short circuit any gap between the rod 5 and the end 7 of the casing and, also, to prevent leak of the electromagnetic field energy at the threaded joint between the tuning rod 5 and the sleeve 6. The tuning rod 5, the surface of the ferrule 11 and its fingers 13 and the end 14 of the resonance chamber may also be gold-plated or coated in the same manner as the cylindrical wall of the resonance chamber.

For coupling to the resonance chamber there is provided an aperture 15 by which the resonance chamber may be associated with an electrical system, the frequency of the oscillations of which is to be determined. As indicated in Fig. 1, the electrical system may comprise a coaxial circuit having an external conductor 16 and a central conductor 17 provided with a coupling loop 18 extending through the aperture 15 into the region of the interior electromagnetic field.

Figure 7:
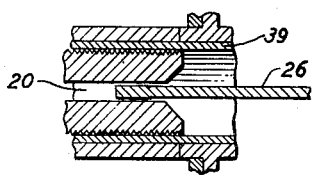

The shaft of the tuning rod 5 terminates at 19 in Fig. 1. As shown, in Figs. 4, 6 and 7, the integral shaft of the tuning rod is provided with a diametrical slot 20 which extends from the end of the rod at 19 to a point 21 also shown in Fig. 1. In order to cause rotation of the tuning rod 5 within its threaded seat to propel it longitudinally an actuator device is provided comprising a handle or knob 22 attached by a set screw connection 23 to the outer end of an actuator 24 having an integral collar 25 and a flattened blade 26, resembling a screw-driver. Blade 26, as indicated in Fig. 7, is slightly thinner at its extremity than the dimension across the slot 20 so that rotation of the actuator handle 22 will cause the blade 26 to rotate tuning rod 5 and thus to propel it longitudinally through the screw-threaded members 6 and 8 without, however, binding or cramping in such manner as to occasion misalignment from a central position.

An indicator casing 27 of cylindrical form fits closely about an end of main casing member 1 and is fixedly connected thereto by screw 28. At its outer end the casing 27 carries an outer end plate 29 connected to an interior circular plate 30, the latter plate being adapted to permit the collar 25 to be positioned between both of these plates.

Casing 27 serves to support and house the revolution counting mechanism and the indicia wheels 31, 32 and 33 one digit of each of which is visible through the transparent windows 34 which fit closely within a longitudinal opening in casing 27.

Figure 5:
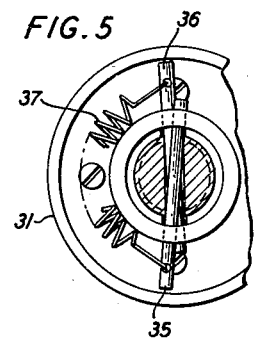

The revolution counting and indicating mechanism is caused to follow the position of slot 20 by two pins 35 and 36 shown in Fig. 5 which extend loosely through slot 20 and are impelled by a helical spring 37 to assume a crossed or X position, the spring being anchored to the pins at one protruding end of each. The pins under the impulsion of the spring tend to diverge in two directions as widely as possible and accordingly come into contact with the walls of a longitudinal slot 38 in a sleeve 39 the outer end of which rides on the inner portion of the central actuator shaft 24. The pins 35 and 36 bearing against the slot walls cause the sleeve 39 to follow the position of slot 20. The outer end of the sleeve 39 is enlarged as at 40 and carries the indicia wheel 33 which is attached thereto by a screw 41. The unit position is therefore shown by the digit of indicia wheel 33 appearing through the windows 34 as indicated particularly in Fig. 8. Graduations of sub-unit separation are engraved or stamped on the outer peripheral margin of the enlarged portion 40 adjacent its end and may be read relatively to a reference mark on the lower surface 42 of plate 30.

Figure 2:
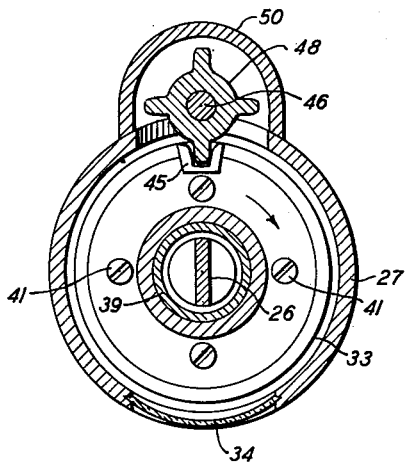
Figs. 2 and 3 are cross-sections of the structure of Fig. 1 along the plane 2—2 of Fig. 1 viewed in the direction of the arrows.
Figure 3:
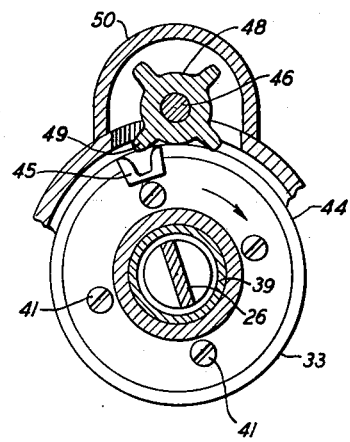
Figure 4:
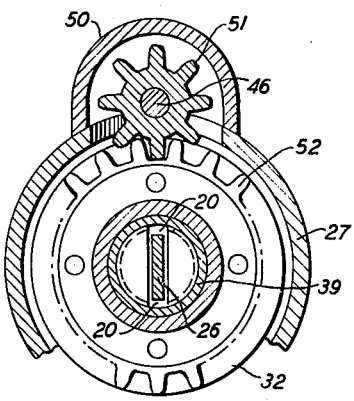

Indicia wheels 31 and 32 are actuated through an intermittent gear chain consisting of continuous toothed gears fixed to the indicia wheels and composite pinions in intermediate driving relation to transfer motion from each indicia wheel to the next. As shown in Fig. 1, the indicia wheel 33 has integrally formed therewith a drum 44 provided with an inset groove member 45 as shown in Fig. 3 which is a cross-section on the plane 2—2 of Fig. 1. Mounted above the drum 44 on a stationary shaft 46 is a composite pinion 47 free to revolve about the shaft and having an intermittent type gear 48 which, as shown in Fig. 3, is in frictional contact with the surface of drum 44 but is prevented from turning until the groove member 45 reaches such a position as to permit tooth 49 of the intermittent gear to enter the groove. Thereupon the tooth 49 is carried along in the manner illustrated in Fig. 2 which shows the same structure as Fig. 3 with the drum 44 rotated slightly in clockwise direction. The shaft 46 seats in sockets in a detachable cover 50 which is clamped to casing 27 by screws 43 as illustrated in Fig. 1. At its other end pinion 47 carries a continuous toothed gear 51, as shown in Fig. 4, meshing with continuous toothed gear 52 of the indicia wheel 32. Accordingly, rotation of the composite pinion 47 occasioned by the rotation of indicia wheel 33 and the intermittent gear coupling to the pinion 47 serves to drive indicia wheel 32 in the same direction as indicia wheel 33. In like manner a composite pinion 53 connects indicia wheel 32 in driving relation to indicia wheel 31.

The operation of the composite pinions is such as to reduce the angular motion of the driven indicia wheel to one revolution for each ten revolutions of the driving wheel. Consequently, as the operator rotates actuator handle 22 the integral blade 26 rotates the shaft of tuning rod 5 to cause its screw threads to advance the rod 5 into the resonance chamber so as to change the natural resonance frequency of the chamber. Pins 35 and 36 extending through the diametrical slot in the tuning rod operate to rotate sleeve 39 which carries the indicia wheel 33 to expose its counting digits in succession through the transparent window 34 nearest the actuator handle. Whenever groove member 45 is brought into proximity to the tooth of pinion 47 it causes a partial rotation of the pinion after which the pinion is held in non-rotating condition until at the end of another revolution of drum 44 the groove 45 is again in position to receive a tooth of the pinion.

The indicia are fully protected against wear caused by handling and corrosion caused by perspiration or salt water as will be apparent from Fig. 8. Moreover, they are easily read even by an entirely untrained operator since with the exception of the sub-units they are portrayed in large clear numerals.

Graduations 54 of sub-units on the enlarged portion 40 enable a relatively precise reading of the position of the tuning rod to be made. To ascertain the numerical frequency of the resonance chamber resort may be had to a table or graph relating tuning rod position to resonance frequency.

The apparatus described is particularly useful for checking the frequency of oscillations in a microwave system. For that purpose the system under measurement is ordinarily provided with a rectifying detector and a sensitive meter such as a milliammeter connected to the output terminals of the detector. The apparatus of Fig. 1 may be coupled to the system under measurement by a coaxial conductor 16, 17 connected to the system in any desired manner and coupled to the apparatus by a coupling loop 18 extending through aperture 15 into the electromagnetic field of the resonant cavity. When the apparatus is tuned to precisely the frequency of the oscillations of the system the very marked reaction which it occasions is indicated by the abrupt and large change of the milliammeter reading.

Fig. 10 shows a modified embodiment of applicant's invention in which, in order to permit the use of a relatively long resonance chamber with a correspondingly large axial rod displacement and long tuning rod shaft the actuator is mounted in a central position instead of at the end. In this embodiment the resonance chamber 55 is in general similar to that of Fig. 1 but is relatively much longer. Tuning rod 56 extends into the resonance chamber through the fingers of a slotted ferrule 57 which are provided with a looped helical spring 58 to position the fingers in close engagement with the tuning rod in order to maintain it in central alignment within the resonant chamber and also to assist in reduction of leak of the energy of the electromagnetic field. The tuning rod 56 is threaded externally to engage the interior threads of the annular block 59 forming the end wall of the resonance chamber. The block 59 also serves to support the tubular resonance chamber 55 by a threaded connection indicated at 60. Also mounted on the block 59 is a housing 61 open at one side as shown in Figs. 12 and 13 to expose the outer surface of an actuator wheel 62 preferably comprising an annular disc of some plastic or other dielectric material. The disc 62 is firmly anchored to a sleeve member 63 which surrounds and rotates freely about an integral extension hub 64 of the block 59. The tuning rod 56 is provided at one side with a longitudinal slot 65 extending substantially the entire length of the tuning rod. A spline 66 extending through the sleeve 63 and projecting loosely into the slot 65 enables an operator to advance or retract the tuning rod 56 by rotation of the actuating disc 62. Also projecting into the slot 65 are two pins 67 and 68 connected to each other by a helical spring 69 which operates in a manner similar to that of the spring 37 of Fig. 1 to spread the pins 67 and 68 and to force them into engagement with the walls of a slot in a sleeve member 70 which is analogous in its function to the sleeve member 39 of Fig. 1. Sleeve member 70 which is held in central alignment by its projection into the central opening of an annular frame member 71 carries a disc 72 to which is attached indicia wheel 73. The other indicia wheels 74 and 75 are operated by intermediate composite pinions 76 and 77 respectively in the same manner as in that of the analogous apparatus of Fig. 1. The position of the tuning rod may be read through the transparent windows 78 the end one of which is somewhat larger than the others to expose the sub-unit graduations 79 on the periphery of the disc 72. Lugs 80 may be provided for attachment of the apparatus to a panel wall or to other equipment when it is to be used in fixed position but, of course, it will be necessary to leave an aperture in the panel through which the disc 62 may be actuated and the indicia wheels may be seen.

It will be appreciated that the apparatus of Figs. 10 to 13, inclusive, permits a large variation of wavelength of the resonant chamber and that it enables the necessary motion of the tuning rod to be obtained in a compact and thoroughly protected structure.

It will be apparent that in each embodiment of the invention a variable resonant system using a space resonant chamber as a wave meter, phantom target, or other high Q tuning device comprises a tuning rod or plunger which extends into the resonant chamber and which is formed integrally with a screw-threaded shaft having a longitudinal slot. The actuator and the cylindrical indicia wheels or drums are mounted in axial alignment with the tuning rod and the screw-threaded shaft and also with the cylindrical space resonance chamber into which the tuning rod projects. Couplings between the shaft and both the indicia wheels and the actuator are provided by members projecting into a longitudinal slot thus permitting the screw-threaded shaft to both rotate and advance axially while the actuator and the indicia wheels rotate without change of their axial position. The indicia wheels and the sub-unit graduations are entirely surrounded and protected by a casing through transparent windows of which the indicia may be viewed. The actuator in the embodiment of Fig. 10 is also mounted within the casing to enable the casing to be restricted to the minimum length necessary to accommodate the tuning rod and its integral screw-threaded shaft. The invention accordingly provides a very rugged and compact structure well protected from external atmospheric and moisture effects and from abrasion which at the same time may be quickly read by an operator with a minimum of training and experience.

What is claimed is:

1. In combination, a resonator comprising a substantially closed cylindrical resonance chamber, a tuning rod mounted by a screw-thread support on one end of the chamber in coaxial relation therewith to permit projecting the rod into and retracting it from the space within the chamber, said rod being longitudinally slotted, an actuator mounted rotatably on the exterior of said chamber in axial alignment with said rod, a position indicator for portraying the position of said rod in said chamber, means utilizing said slot for mechanically connecting said actuator to said rod, said mechanical connecting means comprising a screwdriver-shaped blade connected to said actuator and projecting within said slot whereby rotation of the actuator propels the tuning rod in an axial direction, and means utilizing said same slot for compliantly coupling said position indicator to said rod, said compliant coupling means comprising a sleeve coaxial with said rod and connected to said indicator, a pair of pins loosely projected in said slot in engagement with said sleeve causing said sleeve to rotate coaxially with said rod while allowing relative axial movement between said rod and said sleeve as said rod is projected into and out of said chamber.

2. In combination with a rigid support having a screw-threaded opening therethrough and an exteriorly threaded cylindrical element accommodated in said opening for rotational and axial motion, said element having a longitudinal slot in an end portion thereof, means for actuating said element comprising a cylindrical member having an integral flattened blade at one end thereof, said blade slidably accommodated in said slot, an integral collar formed adjacent the other end of said cylindrical member to permit rotational motion only of said member, said rotational motion imparted to said screw-threaded element causing said element to both rotate and advance axially while said flattened blade slides axially in said slot, means for indicating the position of said element with respect to said support, and means for compliantly coupling said indicating means to said element, comprising in combination a sleeve coaxial with said slotted portion of said element, said sleeve provided with an opening adjacent to said slotted portion, a pair of pins loosely disposed in said slot and said opening, a helical spring connecting an end of each of said pins and holding said pins in divergent relation in contact with said opening and said slot, thereby causing said sleeve to follow the rotation of said slot and precluding misalignment due to binding and cramping as said element and slot move axially.

3. Apparatus for indicating the position of a tuning element adapted for displacement in a resonator, said apparatus comprising a rotatably mounted impelling rod integrally connected to the tuning element, the rod having a longitudinal slot, an indicating mechanism having indicia for displaying an indication of the position of the tuning element in the chamber, and means for compliantly coupling the indicating mechanism to the rod comprising a pair of pins loosely projected into the slot, a spring connecting an end of each of the pins to spread the pins within the slot apart in the direction of the circumference of the rod, and means mechanically connected to the indicating mechanism and mounted in proximity to the pins to be engaged thereby for centering the position of the indicating mechanism with reference to the position of the slot.

4. In a resonator having a resonance chamber and a tuning means comprising a piston having a slot and mounted for movement interiorly and exteriorly of said chamber, means for indicating the position of said piston in said chamber comprising a casing enclosing a portion of the piston exteriorly of said chamber, a transparent portion in said casing, indicia-bearing wheels supported within said casing and surrounding the exterior portion of said piston at points opposite said transparent portion to permit a view of the indicia, said indicia wheels being coaxial with the slotted portion of said piston, and a compliant coupling between said wheels and the slotted portion of said piston, said coupling comprising a pair of pins disposed in said slot, a helical spring so connecting an end of each of said pins that both said pins tend to move in opposite rotary directions in said slot, and a sleeve coaxial with said wheels and slotted portion of said piston, said sleeve having one end joined to said wheels and its opposite end adapted to engage said pins whereby said wheels are caused to rotate in response to movement of said piston.

WALTER L. ROTH.

REFERENCES CITED

The following references are of record in the file of this patent:

UNITED STATES PATENTS

| Number | Name | Date |
|---|---|---|
| 981,127 | Scusa | Jan. 10, 1911 |
| 1,107,202 | Savage | Aug. 11, 1914 |
| 1,143,165 | Begusch | June 15, 1915 |
| 2,086,615 | Grundmann | July 13, 1937 |
| 2,236,004 | MacLean | Mar. 25, 1941 |
| 2,349,440 | Lavoie | May 23, 1944 |
| 2,427,107 | Landon | Sept. 9, 1947 |
| 2,444,041 | Harrison | June 29, 1948 |